US011535774B2

(12) United States Patent
Rae et al.

(10) Patent No.: US 11,535,774 B2
(45) Date of Patent: Dec. 27, 2022

(54) BITUMEN CUTBACK COMPOSITIONS AND METHODS OF USE THEREOF

(71) Applicant: Technix EnviroCutter IP Limited, New Plymouth (NZ)

(72) Inventors: Wallace Rae, New Plymouth (NZ); John Brodie Matthews, New Plymouth (NZ); Nargess Puladian, New Plymouth (NZ); Jie Chen, New Plymouth (NZ); Lijin Kuriachan, New Plymouth (NZ)

(73) Assignee: TECHNIX ENVIROCUTTER IP LIMITED, New Plymouth (NZ)

( * ) Notice: Subject to any disclaimer, the term of this patent is extended or adjusted under 35 U.S.C. 154(b) by 0 days.

(21) Appl. No.: 17/688,328

(22) Filed: Mar. 7, 2022

(65) Prior Publication Data
US 2022/0282122 A1 Sep. 8, 2022

(30) Foreign Application Priority Data

Mar. 8, 2021 (NZ) .......................................... 773693
May 10, 2021 (NZ) .......................................... 775920

(51) Int. Cl.
| | | |
|---|---|---|
| *C09D 195/00* | (2006.01) | |
| *C08K 5/101* | (2006.01) | |
| *C08K 5/103* | (2006.01) | |
| *C09D 7/63* | (2018.01) | |
| *C09D 5/02* | (2006.01) | |

(52) U.S. Cl.
CPC .......... *C09D 195/005* (2013.01); *C08K 5/101* (2013.01); *C08K 5/103* (2013.01); *C09D 5/021* (2013.01); *C09D 5/022* (2013.01); *C09D 5/024* (2013.01); *C09D 7/63* (2018.01)

(58) Field of Classification Search
CPC .................................................. C09D 195/005
See application file for complete search history.

(56) References Cited

U.S. PATENT DOCUMENTS

| | | |
|---|---|---|
| 2,877,129 A | 3/1959 | Hardman |
| 6,156,113 A | 12/2000 | Pasquier |
| 6,764,542 B1 | 7/2004 | Lackey et al. |
| 7,252,755 B2 | 8/2007 | Kiser et al. |
| 7,951,238 B2 | 5/2011 | Deneuvillers et al. |
| 2006/0230981 A1 | 10/2006 | Dean |
| 2008/0146477 A1 | 6/2008 | Mentink et al. |
| 2008/0250975 A1 | 10/2008 | Deneuvillers et al. |
| 2010/0204498 A1 | 8/2010 | Iinuma et al. |
| 2011/0146531 A1 | 6/2011 | Mitra |
| 2014/0033951 A1 | 2/2014 | Lafarge |
| 2014/0328625 A1 | 11/2014 | Matthews et al. |
| 2014/0338565 A1 | 11/2014 | Severance et al. |
| 2017/0350079 A1 | 12/2017 | Kitagawa |

FOREIGN PATENT DOCUMENTS

| | | |
|---|---|---|
| GB | 2169611 | 7/1986 |
| WO | 2009068639 | 6/2009 |
| WO | 2017021365 | 2/2017 |
| WO | 2020086558 A1 | 4/2020 |

OTHER PUBLICATIONS

International Search Report and Written Opinion for PCT/NZ2022/050025 dated Apr. 12, 2022, issued from the Australian Patent Office.
Kunchana Bunyakiat, Sukunya Makmee, Ruengwit Sawangkeaw, and Somkiat Ngamprasertsith. "Continuous Production of Biodiesel via Transesterification from Vegetable Oils in Supercritical Methanol". Published in ACS Energy & Fuels 2006, 20, 812-817.
International Search Report for PCT/NZ2012/000212 dated Mar. 12, 2013.

*Primary Examiner* — Michael F Pepitone
(74) *Attorney, Agent, or Firm* — Christopher M. Scherer; DeWitt LLP

(57) ABSTRACT

A bitumen cutback composition is described substantially comprising Compound A with a formula:

$$R1-X-R2 \qquad \text{[COMPOUND A]}$$

where R1 is alkyl or phenyl hydrocarbon group; X is an O—C═O group; and R2 is a C1-C13 hydrocarbon chain branched or non-branched, with none, one, or more than one, oxygen interruption(s). The bitumen cutback composition may comprise: alkyl esters of fatty acids, esters of trihydroxy alcohols, mono ester, or di, or tri, hydroxy alcohols, phenyl alkyl esters, phenoxy alcohols and their esters, ether alcohols and their esters, and combinations thereof. Cutback bitumen mixtures are described comprising bitumen; and bitumen cutback composition. The cutback bitumen mixtures may be configured as a hot mix composition; a cold mix composition; or an emulsion, the emulsion further comprising an aqueous compound. Methods of temporarily reducing a viscosity of bitumen and methods of applying bitumen to a substrate are also described.

15 Claims, 10 Drawing Sheets

BITUMEN CUTBACK COMPOSITIONS AND METHODS OF USE THEREOF

CROSS-REFERENCE TO RELATED APPLICATIONS

The present application claims priority to New Zealand Patent Application No. 773693, filed Mar. 2, 2021, and New Zealand Patent Application No. 775920, filed May 10, 2021, the contents of which are incorporated herein by reference in their entireties.

TECHNICAL FIELD

Described herein are bitumen cutback compositions and methods of use thereof. More specifically, compositions are described that provide cutback properties to bitumen along with bitumen compositions comprising the cutback composition and methods of use of the cutback composition.

BACKGROUND ART

As noted above, described herein are bitumen cutback compositions, also known as cutback agents, cutters, cutback additives, bitumen solvents, bitumen diluents or bitumen thinners. These terms and grammatical variations thereof are used interchangeably herein collectively referring to the way such compositions achieve a short-term reduction in bitumen viscosity and which subsequently disperse from the bitumen after application.

Bitumen

Bitumen is a viscoelastic complex hydrocarbon mixture comprising many high molecular weight compounds that is black in colour. Although there are a few natural sources of bitumen available, bitumen is generally sourced from crude oil refineries. Due to its waterproof, adhesiveness and viscoelastic nature, bitumen is used as the binder for the construction of flexible pavement all over the world. Bitumen can be classified mainly in three ways: through penetration grade, performance grade, or viscosity. Bitumen is used to hold together aggregates in pavements. It is also used in roofing and waterproofing products. It is a highly viscous waterproof adhesive at ambient temperatures.

The general composition of bitumen falls into the following broad categories.

Asphaltene: brown/black amorphous solids of high molecular weight, typically 1000-50,000. Asphaltenes generally comprise 5-25% by weight of the bitumen.

Resins: dark brown solids or semi-solids. They are adhesive and very polar in nature. Molecular weights are typically 900-1300. Resins may comprise 5-50% by weight of the bitumen.

Aromatics: generally dark brown viscous liquids. Molecular weight is typically 500-900. Usually present at 40-60% by weight in the bitumen.

Saturates: solids or viscous liquids, light coloured, with molecular weights in the range 500-800. This fraction may be present from 1 to 25% by weight in the bitumen.

Application of Bitumen

A common method of application of bitumen is by spraying the bitumen at elevated temperatures (170° C. to 180° C.) onto a surface and then to apply stone chips (generally single sized aggregates) to the bitumen surface. This is variously known as bitumen spray sealing, bitumen seal coating, chip sealing or surface dressing, herein referred to as spray sealing.

This can be contrasted with "hot-mix" or asphaltic concrete applications where bitumen and the aggregate are mixed together and then applied to the pavement or "cold-mix" (or plant-mix) applications where highly cutback bitumen and aggregate are mixed together and then applied to the pavement.

Cutback Agent Properties

Important properties of cutback agents or cutters are: solubility, the viscosity reducing effects of the cutback agent, evaporative rate, stability, and safety.

Solubility relates to the miscibility of the agent with the bitumen. Viscosity reducing refers to the ability of the cutback agent to reduce the viscosity of the bitumen once mixed to make application easier. Evaporative rate refers to the rate and extent to which the cutback agent separates from the bitumen post application. An ideal cutback agent completely leaves the bitumen post application in a matter of days or weeks to let the bitumen remain. Stability refers to the cutback agent not modifying the bitumen properties or not modifying the properties in a manner that is detrimental to the long term stability of the eventual surface e.g. a road or pavement. Safety relates to issues surrounding handling of the cutback agent(s) and environmental factors. By way of example, an ideal cutback agent would be safe to handle, non-toxic, non-explosive, non-flammable etc. An ideal cutback agent would also not impact on greenhouse gas emissions and not impact surrounding land or waterways. Other factors might include being sourced from renewable sources or from recycled or waste streams.

Kerosene as a Cutter

Kerosene is frequently used in many countries "cutter" or "cutback agent" with bitumen. Kerosene is effective at reducing bitumen viscosity and post application, kerosene evaporates effectively from the bitumen becoming a negligible component of the bitumen seal a few months after application.

Kerosene is used as a bitumen cutback agent at different concentrations according to local conditions and requirements. In New Zealand cutback bitumen for use in bitumen spray sealing typically contains 2 to 7% (w/w) of kerosene. Another application for cutback bitumen is as a 'primerseal' or first coat where the cutback bitumen comprises 5-21% (w/w) kerosene. In cutback bitumen for use as a primer 30 to 50% (w/w) of kerosene may be used.

There are several disadvantages associated with this use of kerosene for bitumen cutbacks around safety, environmental factors and cost.

For example, the cutback bitumen is hazardous to use since the temperatures used during spray application is 160° C. to 170° C. which is well above the flashpoint of the kerosene and bitumen mixture.

In addition, evaporation of kerosene into the atmosphere is environmentally harmful. It is estimated that around 2,000 to 4,000 tonnes of kerosene is released into the atmosphere each year in New Zealand alone. The vapours emanating from the cutback bitumen are harmful to the environment, have unpleasant odours and the kerosene is derived from a non-renewable resource.

Kerosene also carries a significant cost and, being non-renewable, the raw material is lost and not able to be recycled.

Given the above issues, the use of kerosene as a cutter is being phased out in many countries.

Bitumen Water Emulsions

One approach to avoid use of kerosene is to produce bitumen-water emulsions. In this case, bitumen, water and an emulsifier or emulsifiers are mixed together to form a bitumen-water emulsion.

This method also has disadvantages including high energy use to cause mixing, high water volumes needed (30-40% by weight) which may carry a significant material cost and high transport cost. Further, water is a valuable resource and use in this manner is not ideal, particular at the volumes required and the fact that, once mixed, the water is not able to be re-used without considerable treatment if re-use is possible at all. Emulsifiers and adhesion agents used also increase material costs to a point where, overall, the spray sealing cost using bitumen water emulsion is around 15% higher than spray sealing cost using kerosene as the cutback agent.

Further, bitumen emulsions are sensitive to rain—should rain occur during the application or in the immediate period thereafter, the water and bitumen phases may not have time to separate and the bitumen coalesce. Rain water exacerbates the problem. The unbroken emulsion and/or not coalesced bitumen (typically 2-8 micron particles) may wash from the surface and potentially into waterways, causing significant damage to aquatic life and drinking water.

Further, water separation from the bitumen post application happens relatively slowly causing longer delays before roads or pavements are re-opened and lengthening the vulnerable time period where run off may occur.

As a result of the above disadvantages, bitumen water emulsions are not widely used and when used, must be used with care and not used when wet weather is predicted.

Carboxylic Acid Methyl Ester Cutter Compositions

NZ606702 describes the use of plant based carboxylic acid methyl esters as cutters, in particular, caprylic methyl ester to myristic methyl ester (C8 to C14). This cutback agent has had some success in that it avoids the flash point issues of kerosene, reduces some of the material considerations and possible run off issues from emulsions and, allows for sufficient solvency to reduce bitumen viscosity required of a cutback agent. This approach is however costly due to the raw materials being comparatively higher in cost than kerosene or water along with other issues.

Dibasic Esters

US2019/016,406A describes the use of dibasic esters (esters of dibasic acids typically succinic, glutaric, adipic) as cutters, particularly the esters of isobutyl alcohol and methanol. Compared to hydrocarbons and biodiesel these solvents are relatively expensive and their ranges of solvency for all bitumen grades are limited. The inventors found that methyl esters of dibasic acids, such as Rhodiasolve™ RDPE were not miscible without a cosolvent hence this approach is not ideal.

Biodiesel

U.S. Pat. No. 6,764,542A promotes the use of biodiesel as a cutter, typically via C16 to C18 monoesters of fatty acids. Many of the compounds in biodiesel have boiling points beyond 330° C. hence most of this biodiesel material would be retained with the bitumen as a flux post application hence biodiesel is not an effective cutter. Biodiesel also has reduced solvency for asphaltenes, a key component in bitumen, at room temperature.

As may be appreciated from the above, providing an alternative cutter composition that addresses at least some of the above problems and yet still meets the desired cutter properties may be useful or at least provide the public with a further choice of cutter.

Further aspects and advantages of the bitumen cutback compositions and methods of use thereof will become apparent from the ensuing description that is given by way of example only.

SUMMARY

Described herein are bitumen cutback compositions that provide cutback properties to bitumen along with bitumen compositions comprising the cutback composition and methods of use of the cutback composition.

In a first aspect, there is provided a bitumen cutback composition substantially comprising Compound A with a formula:

R1-X—R2                     [COMPOUND A]

where R1 is alkyl or phenyl hydrocarbon group;
X is an O—C=O group; and
R2 is a C1-C13 hydrocarbon chain branched or non-branched, with none, one, or more than one, oxygen interruption(s).

In a second aspect, there is provided a bitumen cutback composition comprising:
alkyl esters of fatty acids,
esters of trihydroxy alcohols,
mono ester, or di, or tri, hydroxy alcohols,
phenyl alkyl esters,
phenoxy alcohols and their esters,
ether alcohols and their esters, and
combinations thereof.

In a third aspect, there is provided a bitumen cutback mixture comprising:
bitumen; and
bitumen cutback composition, the bitumen cutback composition substantially comprising Compound A with a formula:

R1-X—R2                     [COMPOUND A]

where R1 is alkyl or phenyl hydrocarbon group;
X is an O—C=O group; and
R2 is a C1-C13 hydrocarbon chain branched or non-branched, with none, one, or more than one, oxygen interruption(s).

In a fourth aspect, there is provided a bitumen cutback mixture comprising:
bitumen; and
bitumen cutback composition, the bitumen cutback composition comprising:
alkyl esters of fatty acids,
esters of trihydroxy alcohols,
mono ester, or di, or tri, hydroxy alcohols,
phenyl alkyl esters,
phenoxy alcohols and their esters,
ether alcohols and their esters, and
combinations thereof.

In a fifth aspect, there is provided a method of temporarily reducing the viscosity of bitumen comprising:
selecting bitumen to be treated; and
mixing the selected bitumen with a bitumen cutback composition, the bitumen cutback composition substantially comprising Compound A with a formula:

R1-X—R2                     [COMPOUND A]

where R1 is alkyl or phenyl hydrocarbon group;
X is an O—C=O group; and
R2 is a C1-C13 hydrocarbon chain branched or non-branched, with none, one, or more than one, oxygen interruption(s).

In a sixth aspect, there is provided a method of temporarily reducing the viscosity of bitumen comprising:
selecting bitumen to be treated; and
mixing the selected bitumen with a bitumen cutback composition, the bitumen cutback composition comprising:
alkyl esters of fatty acids,
esters of trihydroxy alcohols,
mono ester, or di, or tri, hydroxy alcohols,
phenyl alkyl esters,
phenoxy alcohols and their esters,
ether alcohols and their esters, and
combinations thereof.

In a seventh aspect, there is provided a method of applying bitumen to a substrate by:
mixing bitumen and a bitumen cutback composition to form a cutback bitumen mixture; and
applying the cutback bitumen mixture to a substrate;
wherein the bitumen cutback composition substantially comprises Compound A with a formula:

$$R1-X-R2 \qquad [\text{COMPOUND A}]$$

where R1 is alkyl or phenyl hydrocarbon group;
X is an O—C=O group; and
R2 is a C1-C13 hydrocarbon chain branched or non-branched, with none, one, or more than one, oxygen interruption(s).

In an eighth aspect, there is provided a method of applying bitumen to a substrate by:
mixing bitumen and a bitumen cutback composition to form a cutback bitumen mixture; and
applying the cutback bitumen mixture to a substrate;
wherein the bitumen cutback composition comprises:
alkyl esters of fatty acids,
esters of trihydroxy alcohols,
mono ester, or di, or tri, hydroxy alcohols,
phenyl alkyl esters,
phenoxy alcohols and their esters,
ether alcohols and their esters, and
combinations thereof.

In a ninth aspect, there is provided a cutback bitumen mixture comprising bitumen and bitumen cutback composition configured as:
a hot mix composition;
a cold mix composition; or
an emulsion, the emulsion further comprising an aqueous compound;
wherein the bitumen cutback composition substantially comprises Compound A with a formula:

$$R1-X-R2 \qquad [\text{COMPOUND A}]$$

where R1 is alkyl or phenyl hydrocarbon group;
X is an O—C=O group; and
R2 is a C1-C13 hydrocarbon chain branched or non-branched, with none, one, or more than one, oxygen interruption(s).

In a tenth aspect, there is provided a cutback bitumen mixture comprising bitumen and bitumen cutback composition configured as:
a hot mix composition;
a cold mix composition; or
an emulsion, the emulsion further comprising an aqueous compound;
wherein the bitumen cutback composition comprises:
alkyl esters of fatty acids,
esters of trihydroxy alcohols,
mono ester, or di, or tri, hydroxy alcohols,
phenyl alkyl esters,
phenoxy alcohols and their esters,
ether alcohols and their esters, and
combinations thereof.

Selected advantages of the above described bitumen cutback compositions and methods of use thereof include greater safety, superior wetting and penetration, superior dilution ratio for a given viscosity, better environmental aspects, comparable or superior evaporation rate, and versatility of use. These advantages will be described further in the detailed description and examples below.

BRIEF DESCRIPTION OF THE DRAWINGS

Further aspects of the bitumen cutback compositions and methods of use thereof will become apparent from the following description that is given by way of example only and with reference to the accompanying drawings in which.

DETAILED DESCRIPTION

Figure 1:
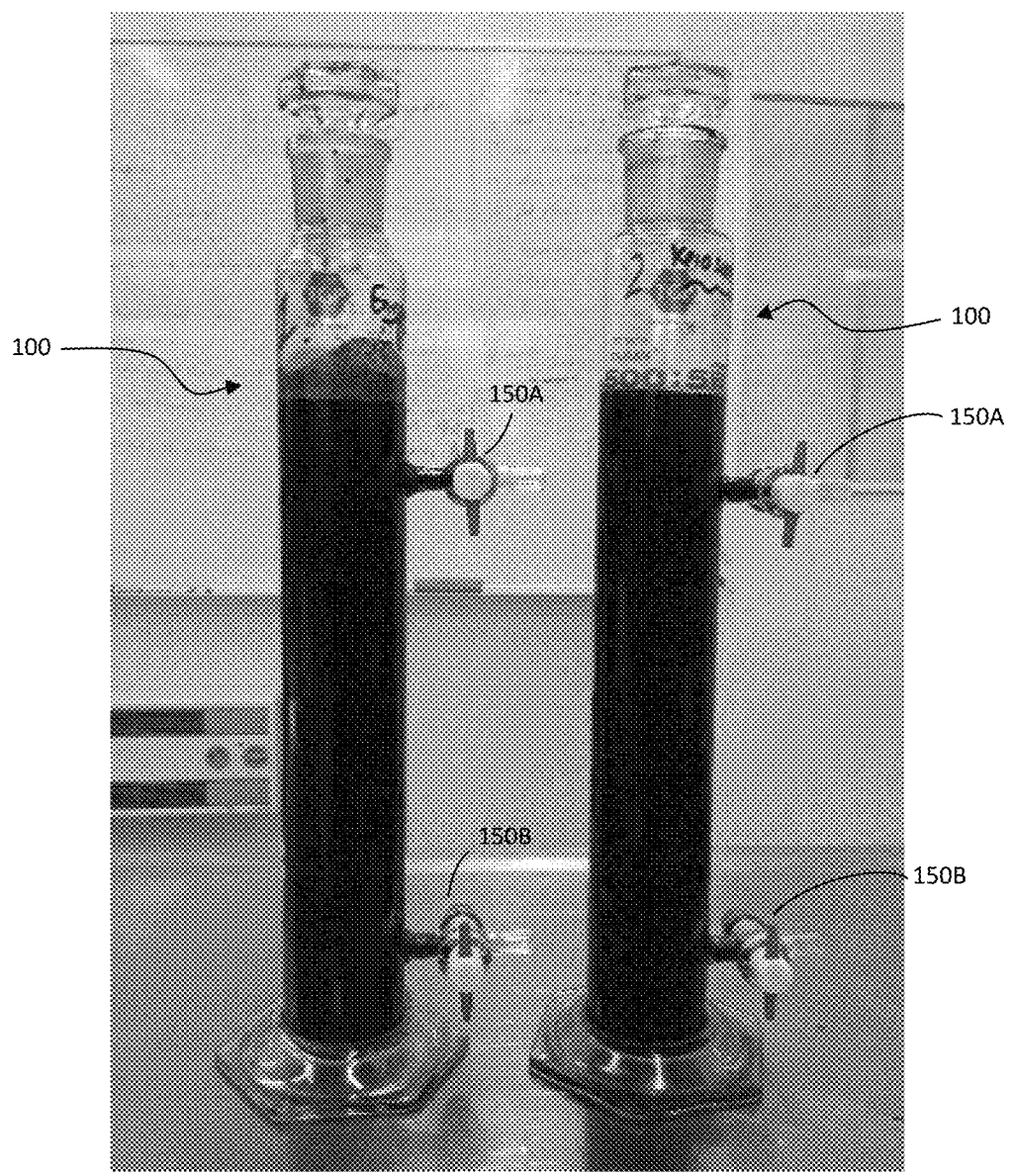
FIG. 1 is a photo of test samples in 500 ml measuring cylinders, the cylinders being used for viscosity measurement.

As noted above, described herein are bitumen cutback compositions that provide cutback properties to bitumen along with bitumen compositions comprising the cutback composition and methods of use of the cutback composition.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e. that it will be taken to mean an inclusion of not only the listed components it directly references, but also other non-specified components or elements.

Bitumen Cutback Composition

In a first aspect, there is provided a bitumen cutback composition substantially comprising Compound A with a formula:

 [COMPOUND A]

where R1 is alkyl or phenyl hydrocarbon group;
X is an O—C=O group; and
R2 is a C1-C13 hydrocarbon chain branched or non-branched, with none, one, or more than one, oxygen interruption(s).

Compound A

In one embodiment, R1 may be an alkyl group with less than or equal to 13 carbon atoms, the alkyl group being branched or straight.

In a further embodiment, Compound A may comprise a total of 6 to 13 carbon atoms.

Compounds

In a second aspect, there is provided a bitumen cutback composition comprising:
alkyl esters of fatty acids,
esters of trihydroxy alcohols,
mono ester, or di, or tri, hydroxy alcohols,
phenyl alkyl esters,
phenoxy alcohols and their esters,
ether alcohols and their esters, and
combinations thereof.

Note that the compound group termed phenyl alkyl esters noted above may be termed alkyl phenyl esters. These are the same compounds and the naming may be used interchangeably in the art and herein.

VOC

As may be appreciated, the above described compounds may be classed as being volatile organic compounds or VOC's with a relatively high vapour pressure and high boiling point. 'Volatile' in the context of the cutback composition compounds described herein relates to the compound(s) having a vapour pressure at or below approximately 0.01 hPa at 25° C. This volatility allows the cutback composition described to evaporate or separate from the bitumen once applied in a similar manner to kerosene does in prior art cutback bitumen mixtures using kerosene.

Miscible

In one embodiment, the bitumen cutback composition described may be substantially miscible with bitumen at ambient temperature and pressure i.e. temperatures ranging from −5° C. to 40° C. and atmospheric pressure. The inventors have found that the cutback composition is completely miscible in bitumen with no visible separation or precipitation.

Bitumen comprises a wide range of compounds as noted above creating a challenging environment for miscibility. The selected compounds noted above appear to be highly miscible with bitumen including miscible with asphaltene, this compound in bitumen being a particularly difficult compound to mix with.

Flash Point

The bitumen cutback composition (absent of bitumen) may have a flash point greater than 50° C. at ambient temperature and pressure. In one embodiment, the bitumen cutback composition may have a flash point greater than 95° C. at ambient temperature and pressure. In experiments completed by the inventors, the bitumen cutback composition may have a flash point in the range 97-98° C. at ambient temperature and pressure. This flash point contrasts favourably against art cutback agents like kerosene which have a much lower flash point (43° C.) and are therefore more difficult to work with, especially when elevated composition temperatures are required as is typically the case with bitumen in order to reduce the bitumen viscosity during mixing with cutback agent.

When mixed with bitumen to form a cutback bitumen mixture, the mixture flash point in the inventors experience varies from 126° C. to 184° C. for a cutback composition concentration of 2-7% by weight. By contrast, a kerosene bitumen mixture at the same concentration of kerosene in the bitumen was found by the inventors to have a much lower flash point (80-107° C.).

Solubility and/or Stability Enhancer

The bitumen cutback composition may further comprise at least one solubility and/or stability enhancer compound. These may be used to achieve or enhance selected properties e.g. to aid mixing with bitumen and to increase (or decrease) the time that the cutback composition remains in or with bitumen before separation occurs. The solubility and/or stability enhancer compound may be selected from: esters of carboxylic acids, esters of trihydroxy alcohols, biodiesel, mono ester of di or tri hydroxy alcohols, and combinations thereof. Where used, the bitumen cutback composition solubility and/or stability enhancer compound(s) may comprise 20-30% by weight of the cutback bitumen composition.

Diethylene Glycol Monoethyl Ether Acetate

In one embodiment, Compound A or a compound selected from the group esters of ether alcohols noted above in the bitumen cutback composition may be diethylene glycol monoethyl ether acetate. If used, diethylene glycol monoethyl ether acetate may be included in the cutback composition at a rate of approximately 15-40% of the bitumen cutback composition by weight. As may be appreciated, Compound A may comprise a number of different compound types. Diethylene glycol monoethyl ether acetate was chosen as one option for Compound A in experiments completed by the inventors as this compound is easy to obtain and relatively inexpensive hence making the final product cost competitive.

Ethyl Benzoate

In one embodiment, the bitumen cutback composition may comprise ethyl from the group pf phenyl alkyl esters. If ethyl benzoate is used, it may be included at a rate of approximately 35-50% of the bitumen cutback composition by weight. As above, ethyl benzoate was chosen as one type of phenyl alkyl ester in experiments completed by the inventors as this compound is easy to obtain and relatively inexpensive hence making the final product cost competitive.

2,2,4-Trimethyl-1,3-Pentanediol Monoisobutyrate

In one embodiment, the bitumen cutback composition may comprise 2,2,4-trimethyl-1,3-pentanediol monoisobutyrate from the group monoester of di-alcohol. If 2,2,4-trimethyl-1,3-pentanediol monoisobutyrate is used, it may be included at a rate of approximately 15% of the bitumen cutback composition by weight. As above, 2,2,4-trimethyl-1,3-pentanediol monoisobutyrate was chosen as one type of monoester of di-alcohol in experiments completed by the inventors as this compound is easy to obtain and relatively inexpensive hence making the final product cost competitive.

Boiling Point

The bitumen cutback composition may have a boiling point of approximately 150° C. to 350° C. In one embodiment, the boiling point may be approximately 190° C. to 340° C.

Cutback Composition Viscosity

The bitumen cutback composition itself with no bitumen present may have a viscosity at 40° C. of approximately 1-2.5 cSt. In one embodiment, the cutback composition viscosity may be approximately 2.25 cSt @40° C.

Water Content

The bitumen cutback composition may have a water content of less than 1000 mg/kg or less than 0.1% weight. That is to say that cutback composition is substantially absent of water and is non-aqueous.

Rate of Transfer

Post mixing with bitumen, a rate of transfer of the bitumen cutback composition from bitumen is substantially similar as that for a kerosene containing bitumen cutback composition. Transfer from bitumen may be via evaporation although methods of transfer are not excluded herein. For ease of further reference however, evaporation will be referred to as the mechanism by which the cutback composition separates from the bitumen post mixing.

Stability

The bitumen cutback composition may confer a storage stability on a cutback bitumen mixture comprising the bitumen cutback composition as measured in terms of viscosity and miscibility of at least 3 days without a substantial change from the viscosity and miscibility measured after initial formation of a cutback bitumen mixture.

Density

The bitumen cutback composition may have a density of approximately 900-1100 kg/m$^3$.

Explosivity

In the inventors experience, the explosivity of a cutback bitumen mixture comprising the cutback composition described herein may be substantially less explosive than a cutback bitumen mixture comprising a comparable amount of kerosene. In one embodiment, for a cutback bitumen mixture comprising 7% by weight cutback composition, explosion does not occur until a temperature of approximately 222° C. By contrast, a comparable mixture using kerosene at 7% by weight explodes at a temperature of approximately 132° C., significantly lower than the cutback composition described herein.

This explosivity temperature is of key importance during application of bitumen. Depending on the grade of bitumen, the application (spraying) temperature varies from 140° C. to 180° C. for a cutback bitumen mixture comprising around 7% cutback composition. The harder the grade of the bitumen, the higher the spraying temperature hence, this spray temperature can increase beyond 180° C. As may be appreciated, an explosion temperature of the cutback bitumen well in excess of the application temperature will be of benefit for safety and handling.

Bitumen Cutback Mixture

In a third aspect, there is provided a cutback bitumen mixture comprising:
bitumen; and,
bitumen cutback composition, the bitumen cutback composition substantially comprising Compound A with the formula:

R1-X—R2  [COMPOUND A]

where R1 is alkyl or phenyl hydrocarbon group;
X is an O—C=O group; and
R2 is a C1-C13 hydrocarbon chain branched or non-branched, with none, one, or more than one, oxygen interruption(s).

In a fourth aspect, there is provided a cutback bitumen mixture comprising:
bitumen; and,
bitumen cutback composition, the bitumen cutback composition comprising:
alkyl esters of fatty acids,
esters of trihydroxy alcohols,
mono ester, or di, or tri, hydroxy alcohols,
phenyl alkyl esters,
phenoxy alcohols and their esters,
ether alcohols and their esters, and
combinations thereof.

Ratio Cutback Composition and Bitumen

In one embodiment the bitumen cutback composition may be added to bitumen at a rate of 1-40% by weight. As may be appreciated, so-called primer mixtures may have a grater quantity of cutback composition added (20-40%) while regular mixtures e.g. for a non-primer road surface may have a lesser amount added e.g. 2-9% cutback composition. Primerseal bitumen cutback compositions may comprise 5-21% (w/w) of bitumen cutback composition in the bitumen. These quantities are commensurate with art kerosene cutback bitumen mixtures although some variation to kerosene rates may occur due to the superior ability of the cutback composition to reduce bitumen viscosity relative to kerosene i.e. you require less cutback composition compared to kerosene to achieve a desired reduction in bitumen mixture viscosity.

Method of Temporarily Reducing the Viscosity of Bitumen

In a fifth aspect, there is provided a method of temporarily reducing the viscosity of bitumen comprising:
selecting bitumen to be treated; and
mixing the selected bitumen with a bitumen cutback composition, the bitumen cutback composition substantially comprising Compound A with a formula:

R1-X—R2  [COMPOUND A]

where R1 is alkyl or phenyl hydrocarbon group;
X is an O—C=0 group; and
R2 is a C1-C13 hydrocarbon chain branched or non-branched, with none, one, or more than one, oxygen interruption(s).

In a sixth aspect, there is provided a method of temporarily reducing the viscosity of bitumen comprising:
selecting bitumen to be treated;
mixing the selected bitumen with a bitumen cutback composition, the bitumen cutback composition comprising:
alkyl esters of fatty acids,
esters of trihydroxy alcohols,
mono ester, or di, or tri, hydroxy alcohols,
phenyl alkyl esters,
phenoxy alcohols and their esters,
ether alcohols and their esters, and
combinations thereof.

As will be appreciated, the bitumen cutback composition described herein has the effect of reducing the viscosity of bitumen allowing the bitumen to be applied to a substrate e.g. via spraying. The inventors have found that the extent of viscosity reduction is comparable or superior to kerosene for a given concentration of cutback composition. In one embodiment, a cutback bitumen mixture comprising 2-7% by weight cutback composition described herein may have a viscosity of approximately 9517.0 to 724.0 Pa·s @25° C. For kerosene, the inventors found that, for the same concentrations of kerosene (2-7% by weight in 180/200 bitumen), the viscosity was 12860.0-1345.0 Pa·s @25° C. The cutback composition described herein therefore provides a 26-46% higher reduction in viscosity for a given concentration compared to kerosene.

Method of Applying Bitumen to a Substrate

In a seventh aspect, there is provided a method of applying bitumen to a substrate by:

mixing bitumen and a bitumen cutback composition to form a cutback bitumen mixture;

applying the cutback bitumen mixture to a substrate;

wherein the bitumen cutback composition substantially comprises Compound A with the formula:

R1-X—R2             [COMPOUND A]

where R1 is alkyl or phenyl hydrocarbon group;

X is an O—C=0 group; and

R2 is a C1-C13 hydrocarbon chain branched or non-branched, with none, one, or more than one, oxygen interruption(s).

In an eighth aspect, there is provided a method of applying bitumen to a substrate by:

mixing bitumen and a bitumen cutback composition to form a cutback bitumen mixture; and applying the cutback bitumen mixture to a substrate;

wherein the bitumen cutback composition comprises:

alkyl esters of fatty acids,
esters of trihydroxy alcohols,
mono ester, or di, or tri, hydroxy alcohols,
phenyl alkyl esters,
phenoxy alcohols and their esters,
ether alcohols and their esters, and
combinations thereof.

Aggregate

In the above methods, aggregate may be applied to the substrate after application of the cutback bitumen mixture to the substrate. The aggregate may be stone of a selected grade or size. The aggregate may adhere to the bitumen cutback mixture. Alternatively, aggregate may be pre-mixed with the bitumen and cutback composition to form a cutback bitumen and aggregate mixture and this mixture then applied to a substrate. Where aggregate is added, an adhesion agent or agents may be added to the cutback bitumen mixture. The inventors found that the cutback composition described gave the same or better adhesion of aggregate as an equivalent kerosene based cutback bitumen mixture. In addition, amine based adhesion agents commonly used are compatible with the above described cutback agents hence no new or varied adhesion agents are required to what is already used in the art.

Spraying

The cutback bitumen mixture may be applied to the substrate via spraying. Spraying may occur using existing infrastructure already widely used for kerosene cutter and bitumen mixtures and no special equipment is needed—that is the mixers, nozzles, service lines, trucks and other items used for spraying of bitumen to substrates may be used with the cutback compositions described herein without modification.

Spraying may occur at temperatures well below that used in the art. The inventors have found that cutback bitumen mixtures using the bitumen cutback composition described above may be sprayed to a substrate at much lower temperatures than those used to spray cutback bitumen mixtures to a substrate where kerosene is the bitumen cutback composition. Kerosene when used in a cutback bitumen mixture is typically sprayed to a substrate e.g. a road or pavement, at a temperature of 170-180° C. or at least a temperature in excess of 150° C. The inventors in their testing of the cutback composition described herein have found that the spray temperature may be reduced significantly below 150° C. For example, cutback bitumen mixtures using the bitumen cutback composition described above may be sprayed to a substrate at a temperature of 80-150° C., or 80-140° C., or 80-130° C., or 80-120° C. or 90-120° C., or 100-120° C. This substantial reduction in the spray temperature greatly reduces the energy resource needed for spraying and is much safer for handling i.e. the spraying temperature will always be less than the flash point of the cutback bitumen.

In one embodiment, the cutback bitumen mixture including the bitumen cutback composition described herein may be heated during spraying to a temperature greater than 80° C.

Bitumen Configurations

In a ninth aspect, there is provided a cutback bitumen mixture comprising bitumen and bitumen cutback composition configured as:

a hot mix composition; or
a cold mix composition; or
an emulsion, the emulsion further comprising an aqueous compound;

wherein the bitumen cutback composition substantially comprises Compound A with a formula:

R1-X—R2             [COMPOUND A]

where R1 is alkyl or phenyl hydrocarbon group;

X is an O—C=0 group; and

R2 is a C1-C13 hydrocarbon chain branched or non-branched, with none, one, or more than one, oxygen interruption(s).

In a tenth aspect, there is provided a cutback bitumen mixture comprising bitumen and bitumen cutback composition configured as:

a hot mix composition; or
a cold mix composition; or
an emulsion, the emulsion further comprising an aqueous compound;

wherein the bitumen cutback composition comprises:

alkyl esters of fatty acids,
esters of trihydroxy alcohols,
mono ester, or di, or tri, hydroxy alcohols,
phenyl alkyl esters,
phenoxy alcohols and their esters,
ether alcohols and their esters, and
combinations thereof.

Substrate

The term substrate is used herein to refer to a surface to which the cutback composition or cutback bitumen mixture is applied. Substrates may be wide and varied and the same as where bitumen is used already. For example, the bitumen cutback composition may be used to form cutback bitumen mixtures that are applied to roads, pavements, driveways, playing surfaces, paths, roofs walls and so on.

Advantages

Selected advantages of the above described bitumen cutback compositions and methods of use thereof include:

Stability—the described cutback compositions are stable, particularly for use in the production of prime coats where higher cutback composition concentrations are used, and are safer to use due to the higher flash point temperature of the cutback composition relative to the temperature at which the cutback bitumen may be applied at e.g. during spraying.

Prime coats and seals—in the inventor's experience, the described compositions may be ideal for prime coats and primer seals due to their excellent base course aggregate wetting and penetration and in particular, the cutback compositions described are safe to use with a maximum spraying temperature of 100° C.

Dilution Impact and viscosity reduction—the described cutback composition has a greater dilution impact than art cutback agents like kerosene. This is preferable for cutback applications as the greater dilution impact results in a lower viscosity during application to a substrate and therefore easier application/less cutback composition needed to achieve the same viscosity reduction compared to art methods.

Safety—the described cutback compositions and methods of use are non-hazardous to use and handle even at elevated temperatures and they have a mild and non-offensive odour.

Environmental—the environment impact of the described cutback compositions is lower than art compositions in that the compositions described are biodegradable, non-persistent pollutant and they are not harmful to the atmosphere. In the inventors experience, at least a portion of the cutback composition (20-50% by weight) may even be sourced from renewable streams.

Evaporation— the described cutback compositions are volatile and hence evaporate from bitumen rapidly post application of cutback bitumen to a substrate. In the inventor's experience, the rate of evaporation is the same or superior to that seen for cutback bitumen mixtures using kerosene.

Versatility— in the inventor's experience, the cutback compositions described may be used for a wide variety of applications including for example, roads and pavements but also for making bitumen paints, and bitumen products for sealing, coating, lining, roofing and so on. The cutback compositions may also be used for all grades of bitumen including emulsions, both for roading applications such as those used for chip sealing, cold mix, warm mix or hot mix applications and for non-roading applications such as pipe coatings, roofing systems etc. Further, the cutback compositions may be used with all forms of bitumen, including for example straight run, air blown or solvent precipitated bitumen (or mixtures thereof) in liquid form or as an emulsion in water.

Reduced spray temperature—as noted the described cutback bitumen mixture using the cutback composition described herein may be sprayed to a substrate at a substantially lower temperature then is the case for art cutback compositions using kerosene. This is a significant change as it reduces energy requirements and improves/mitigates worker safety.

The embodiments described above may also be said broadly to consist in the parts, elements and features referred to or indicated in the specification of the application, individually or collectively, and any or all combinations of any two or more said parts, elements or features.

Further, where specific integers are mentioned herein which have known equivalents in the art to which the embodiments relate, such known equivalents are deemed to be incorporated herein as if individually set forth.

WORKING EXAMPLES

The above described bitumen cutback compositions and methods of use thereof are now described by reference to specific examples.

Example 1

As should be appreciated from the above description. The cutback compositions described herein may take a variety of forms.

For example, the cutback composition may comprise (in varying amounts and combinations):

Phenyl alkyl esters

Alkyl esters of fatty acids

Esters of trihydroxy alcohols

Esters of ether alcohols

Specific cutback compositions may comprise the following mixtures as shown in Tables 1 to 3 below:

TABLE 1

Composition 1

| Compound Group | Example Compound | Amount (weight %) |
| --- | --- | --- |
| Phenyl alkyl esters | Methyl benzoate | 40-60 |
| Alkyl esters of fatty acids | Biodiesel | 20-40 |
| Esters of trihydroxy alcohols/Compound A | Triglycerides 1,2,3 Triacetoxy propane | 10-30 |

TABLE 2

Composition 2

| Compound Group | Example Compound | Amount (weight %) |
| --- | --- | --- |
| Esters of ether alcohols/Compound A | Butyl glycol acetate | 30-50 |
| Phenyl alkyl esters | Ethyl benzoate | 30-50 |
| Esters of trihydroxy alcohols | Triglycerides 1,2,3 Triacetoxy propane | 10-20 |

TABLE 3

Composition 3

| Compound Group | Example Compound | Amount (weight %) |
| --- | --- | --- |
| Esters of ether alcohols/Compound A | Diethylene glycol mono butyl ether acetate | 40-70 |
| Phenyl alkyl esters | Ethyl benzoate | 30-50 |
| Alkyl esters of fatty acids | Biodiesel | 10-30 |

Example 2

Two cutback compositions were prepared by way of illustration and for use in subsequent experiments described further below. There cutback compositions labelled Product A and Product B comprised the following compounds shown in Tables 4 and 5 below.

TABLE 4

Product A:

| Compound | Quantity (approximate weight %) |
|---|---|
| B100 (being a commercially available biodiesel and mixture of alkyl esters of fatty acids) | 25% |
| Diethylene Glycol Monoethyl Ether Acetate (being one form of 'Compound A' or ester of ether alcohol noted in the above description) | 40% |
| Ethyl benzoate (being a type of phenyl alkyl ester) | 35% |

TABLE 5

Product B:

| Compound | Quantity (approximate weight %) |
|---|---|
| B100 (being a commercially available biodiesel and mixture of alkyl esters of fatty acids) | 20% (weight) |
| Diethylene Glycol Monoethyl Ether Acetate (being one form of 'Compound A' or ester of ether alcohol noted in the above description) | 15% (Weight) |
| Ethyl benzoate (being a type of phenyl alkyl ester) | 50% (weight) |
| 2,2,4-Trimethyl-1,3-pentanediol monoisobutyrate (being a monoester of di-alcohol) | 15% (weight) |

Example 3

In this example, the characteristics of the above cutback compositions from Example 1 are described below in Table 6.

TABLE 6

| Cutback Composition Characteristics | |
|---|---|
| Appearance: | Clear liquid |
| Odour | Pleasant non-offensive light aroma |
| PH | 5-7 |
| Vapour Pressure | 0.094 hPa at 25° C. |
| Density at 15° C. | 0.97-1 kg/litre |
| Viscosity | 2.25 cSt at 40° C. |
| Boiling Point range | 190° C. to 340° C. |
| Flash Point | 97-108° C. |
| Water content | <0.1% wt |
| Other | Non-flammable, non-corrosive |

As may be appreciated from the above, the described cutback composition vary in significant ways to kerosene as a cutback agent. For example, kerosene has a flash point over half of that described in Table 6 (approximately 43° C.). This leads to significantly more difficulty in handling and management.

The above cutback compositions have the ecological information shown in Table 7:

TABLE 7

| Ecological Information | |
|---|---|
| Characteristic | Comments |
| Mobility: | Floats on water. Large volumes may penetrate soil and could contaminate groundwater. |
| Persistence/degradability: | The substance is readily biodegradable |
| Bio accumulative Potential: | Does not significantly accumulate in organisms. |

The above cutback compositions have the following transportation information as shown in Table 8:

TABLE 8

| Transportation Information |
|---|
| Land Transport Rule: Dangerous Goods 2005 - NZS 5433: 2012 Not classified as Dangerous Goods for transport according to the NZS 5433: 2012 Transport of Dangerous Goods on Land |
| IMDG Not classified as Dangerous Goods by the criteria of the International Maritime Dangerous Goods Code (IMDG Code) for transport by sea |
| IATA Not classified as Dangerous Goods by the criteria of the International Air Transport Association (IATA) for transport by air |

Example 4

In this example, an experiment was completed comparing the flash point for the above described cutback compositions from Example 1 versus an art kerosene cutback composition. The cutback compositions (Product A, Product B and kerosene) were tested in a pure form (100% below in Table 6) and in various mixtures with class 180/200 bitumen (penetration grade) shown in Table 9 (2, 4, 5, and 7% by weight of cutback composition (Product A or Product B) mixed with bitumen).

As shown below, the Example 1 cutback compositions marked Product A and Product B in Table 9 below have a higher flash point than a kerosene cutback composition and provides a cutback bitumen mixture with a lower viscosity for a given concentration of cutter compared to kerosene. The flash point of kerosene containing cutback compositions was in fact consistently lower (up to 50% lower) than the cutback compositions of Example 1. Since a lower flash point equates to a greater likelihood of flammability, a (greatly) higher flash point is desirable, particularly a flash point above the typical spray temperature of bitumen used in hot mix application.

TABLE 9

| Measured Flash Point | | | |
|---|---|---|---|
| Weight % Cutback Composition in Bitumen | Flash Point, ° C. (Test Method ASTM D93) | | |
| (100% = no bitumen; 2% = 98% bitumen and 2% cutter and so on) | Cutback Composition A | Cutback Composition B | Art Kerosene Cutback Composition |
| 100% | 98 | 97 | 43 |
| 2% | 184 | 175 | 107 |

TABLE 9-continued

Measured Flash Point

| Weight % Cutback Composition in Bitumen (100% = no bitumen; 2% = 98% bitumen and 2% cutter and so on) | Flash Point, ° C. (Test Method ASTM D93) | | |
|---|---|---|---|
| | Cutback Composition A | Cutback Composition B | Art Kerosene Cutback Composition |
| 4% | 150 | 155 | 97 |
| 5% | 142 | 149 | 96 |
| 7% | 126 | 135 | 80 |

The viscosity of the cutback compositions of Example 2 marked Product A and Product B were also compared to kerosene for mixtures with class 180/200 bitumen (penetration grade) ranging from 2, 4, 5, and 7% cutback composition in bitumen, the results of which are shown below in Table 10.

TABLE 10

Measured Viscosity:

| Weight % cutback composition in Bitumen | Viscosity, [Pa · s at 30° C.] (Test Method ASTM D4402) | | |
|---|---|---|---|
| | Product A | Product B | Kerosene |
| 2% | 2120.0 | 2187.0 | 2407.0 |
| 4% | 677.60 | 722.4 | 847.0 |
| 5% | 380.8 | 449.0 | 489.0 |
| 7% | 155.2 | 214.3 | 210.0 |

As demonstrated above, cutback bitumen mixtures with kerosene as the cutback agent were consistently more viscous for a given concentration of cutback composition than the cutback compositions described herein. Kerosene in art methods is usually added to bitumen at a rate of 4% by weight. At this concentration, the described compositions of Example 2 have a lower or at least comparable viscosity for the cutback bitumen mixture. This makes the use of the cutback compositions described herein more effective at reducing viscosity for a given concentration and hence more effective as a cutback agent and potentially leading to a lower usage per mass of bitumen applied than is the case for art cutback agents like kerosene. Lower cutback requirements reduce material costs and potentially also lower costs associated with equipment breakages such as due to blocked spray nozzles.

Example 5

In this example, the stability of the above described compositions (product A and Product B from Example 2) in terms of miscibility is demonstrated.

Two different tests are used for investigation of cutback agent stability.

The first test is a miscibility test which is required by Australian Standard (AS-3568-2020). This test is a qualitative test and conducted based on the procedure described in (Austroards, 2019). AS 3568-2020 indicates that an oil is suitable for use in terms of its miscibility with bitumen if the bitumen-oil blend visually does not separate, or there is no obvious precipitation of bitumen. This miscibility assessment was completed by mixing one part by weight of the cutback composition labelled Product A or Product B with one part by weight of bitumen (class 170, viscosity grade). Cutback compositions were at ambient temperature during mixing while the bitumen was heated to 120° C. during mixing. As may be appreciated, bitumen is not a fluid at ambient temperature hence must be heated to allow for mixing. The mixture of the cutback composition and bitumen was then allowed to cool to ambient temperature and is inspected for any visible separation or precipitation.

The cutback compositions from Example 1 tested were found to be completely miscible in bitumen by the inventors during their trials. By way of comparison, the above described miscibility test was also conducted for two formulas of the cutback agents described in US2019/016, 1406A1. Both of these cutback agents failed the miscibility test using the same criteria as that used to test the samples of Example 1.

Example 6

In this example a second measure of stability was tested to quantitatively study the storage stability of a cutback agent and bitumen mixture.

The test method used was a modified version of AS/NZS 2341.27 (Austroads, 2019). This method determines the degree of separation of bituminous emulsions that are left unstirred at ambient temperature for 3 days.

Samples were prepared by making a blend of 40 wt % of cutback composition and 60% class 170 bitumen at 80° C., this ratio being comparable to that which might be used to form a bitumen primer which is suggested by Austroads for quality testing of a cutback composition.

Samples were prepared using a mixture of Product A and bitumen, Product B and bitumen, kerosene and bitumen and dimethyl esters (DME—in this case being a mixture of dimethyl adipate, dimethyl succinate and dimethyl glutarate) and bitumen, and a mix of 35% di-isobutyl ester (DIA) and 65% DME and bitumen. DIA in this example being a mixture of di-isobutyl adipate, di-isobutyl succinate and di-isobutyl glutarate). The use of DME or DIA/DME was as per the teachings of art patent US2019/016,406A.

The viscosity of each cutback bitumen mixture was tested at 60° C. to give a zero time result and the samples were then transferred into 500 ml measuring cylinders 100 shown in FIG. 1. The measuring cylinders 100 in FIG. 1 comprise stopcocks 150 at graduations of 50 ml 150A and 450 ml 150B.

After three days, samples were taken from the stopcocks 150, and a repeat viscosity test at 60° C. was completed using the samples taken.

The dynamic viscosities of the samples were measured by using a viscometer.

As shown in Table 11 below, Product A and Product B of the described cutback compositions had a stable viscosity over time. The comparison samples containing as cutters DBE and the mixture 35% DIA and 65% DBE viscosities were found to be outside the range specified for a 40-50% blend after the storage time period (Austroads, 2010).

Kerosene, as anticipated, remained stable in terms of viscosity—a known positive aspect of using kerosene as a cutter.

TABLE 11

| Cutback Composition Tested | Base Viscosity. Pa · s at 60° C. | Upper Viscosity. Pa · s at 60° C. |
|---|---|---|
| Kerosene | 0.035 | 0.035 |
| Product A | 0.054 | 0.053 |
| Product B | 0.064 | 0.066 |
| DME | 1.836 | Too hard to measure |
| 35% DIA + 65% DME | 0.256 | 0.257 |

The tables in Austroads, 2010 are prepared for kerosene cutback agents. There are deviations between the cutback compositions Product A and Product B and kerosene cutback viscosities. These deviations are however small and can be adjusted for by changing the temperature that cutback bitumen is applied at.

Example 7

The evaporation rate of the described composition Product A and Product B from Example 1 was tested, in this case by measuring mass lost over time.

In this example, 300 gm samples of 7% wt blends of cutback composition product 'Product A', 'Product B' and a kerosene comparison sample were added to 130/150 grade bitumen at 120° C. to form cutback bitumen mixtures.

Samples for mass loss tests were initially prepared by pouring a sample mass (12.7±0.1 g) of each sample into 100 mL petri dishes which each had an internal diameter of 78.6 mm.

For each sample, two dishes were used to replicate the findings and an appropriate mass of cutback composition was added to each petri dish sample so that each dish contained a cutback bitumen mixture approximately 2 mm high in the dish volume.

Figure 2:
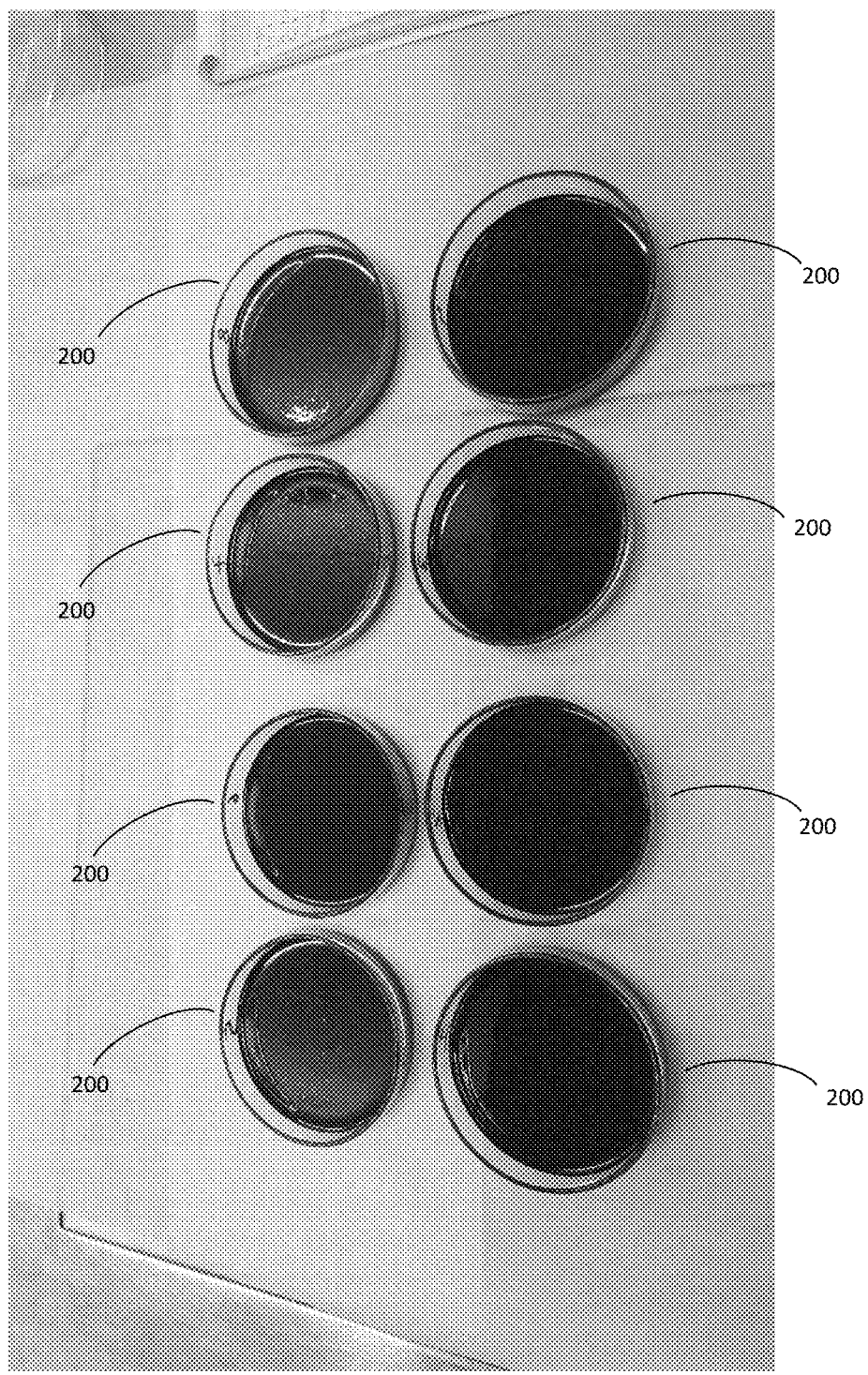
FIG. 2 is a photo of the dish samples used in mass loss trials.

The dishes were tightly sealed and the dish samples were stored at ambient temperature for approximately two hours to ensure homogeneity and then used for initial mass loss tests. A photo of the dish samples 200 prior to sealing is shown in FIG. 2.

The samples were then transferred to an oven with a controlled temperature of 28±0.6° C. for a period of thirty days.

The mass loss in grams of each sample was measured daily during the 30 day time period using a four digit balance.

Figure 3:
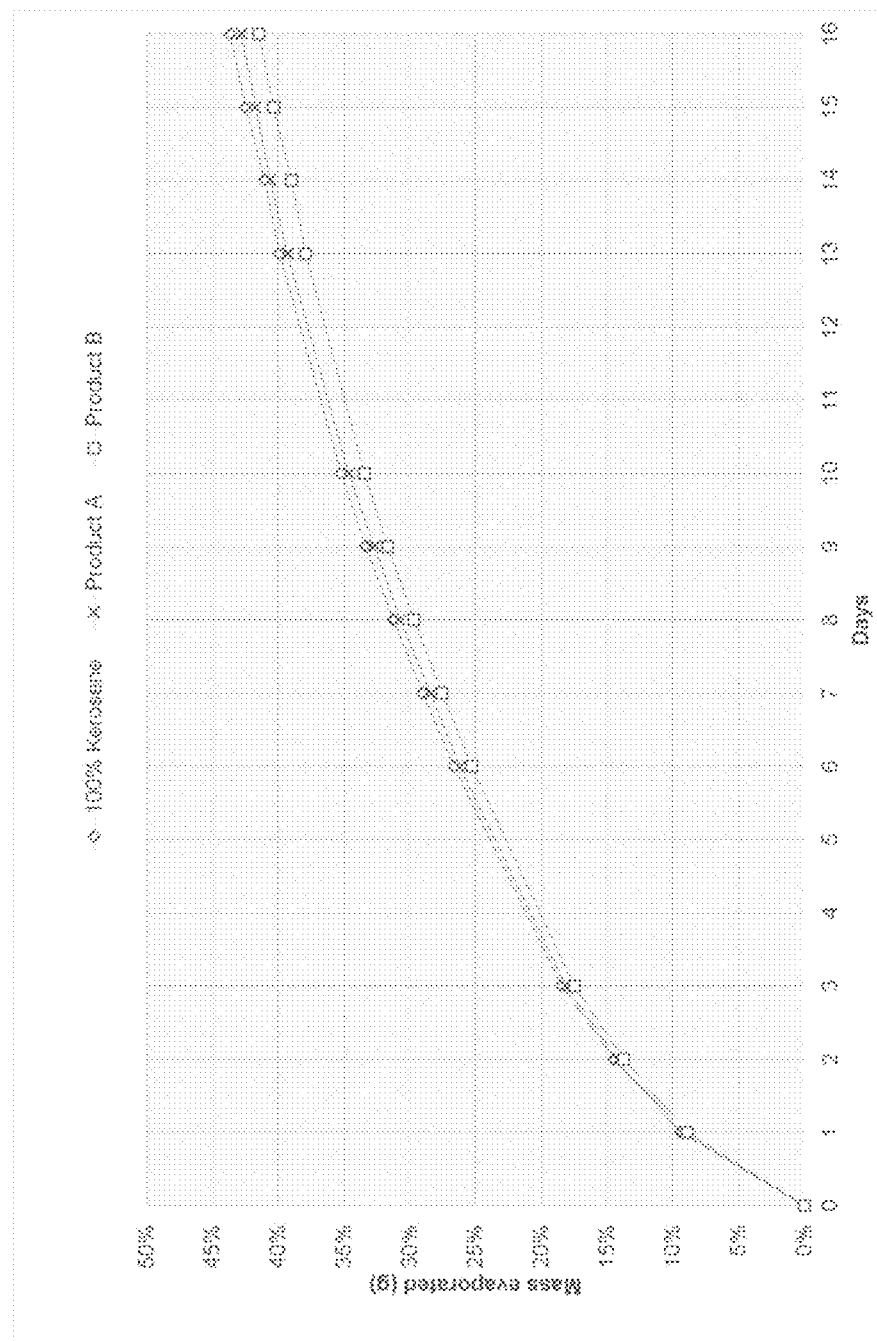
FIG. 3 is a graph showing the rate and extent of mass loss/evaporation of each sample tested.

The graph shown in FIG. 3 illustrates the rate and extent of mass loss/evaporation of each sample.

Figure 4:
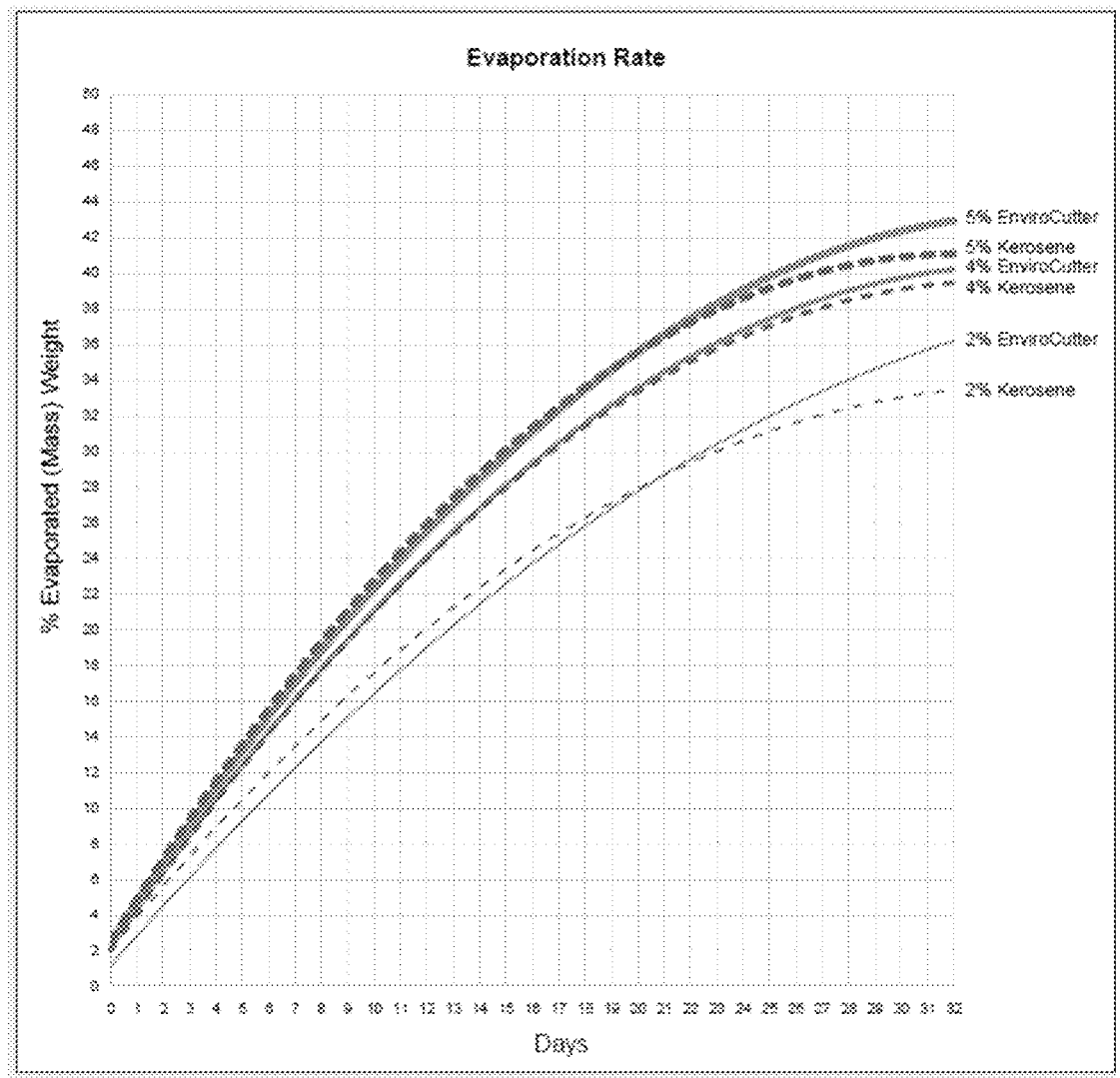
FIG. 4 is a graph of the results of mass loss found for a further test completed.

A further comparative test was completed, in this case using five samples, each weighing 100 grams, of 2%, 4% and 5% blends of Product A and class 130/150 bitumen tested against 2%, 4% and 5% blends of kerosene and 130/150 bitumen. Mixtures were prepared using the same approach as noted above and in this case, transferred to an oven with a controlled temperature of 25±0.5° C. for a time period of 30 days. The mass loss of samples were recorded daily. The results found are shown in FIG. 4 noting that the Product A cutback composition is labelled 'EnviroCutter' in FIG. 4. As shown, the rate of mass loss was comparable or superior to kerosene mass loss.

As can be seen, the rate of mass loss or evaporation between the samples was almost identical illustrating the effectiveness of the described cutback compositions compared to art kerosene use as a cutback agent. The results between replicate sample dishes was consistent throughout the trial.

Example 8

As noted above, a drawback of some art cutter compositions is a low flash point and the difficulties this creates particularly around risk of an explosion. To understand the nature of the described cutback composition, in this case using Product A from Example 2 in regards to explosiveness, an explosion test was completed.

In this example, 7% by weight cutback composition labelled Product A described in Example 2 was compared to an art 7% by weight kerosene composition in cutback bitumen mixtures.

Equipment was used to compare the maximum explosion pressure resulting from the ignition of fumes from the described cutback compositions compared to the maximum explosion pressure resulting from the ignition of kerosene fumes.

Figure 5:
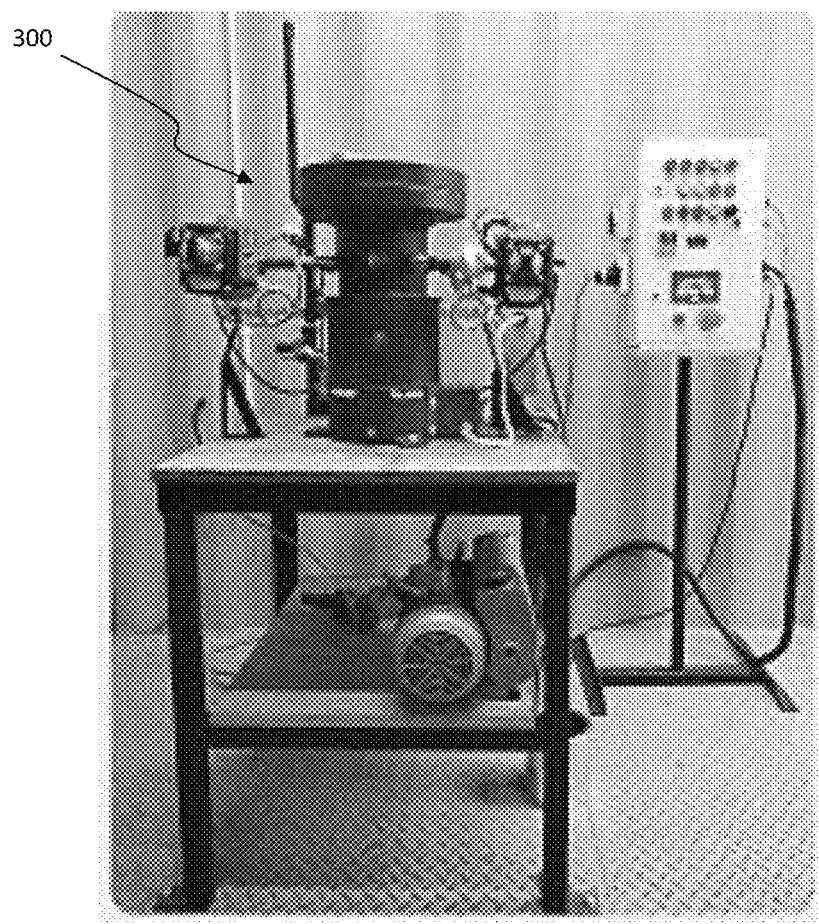
FIG. 5 is a photo of an apparatus used to test the explosiveness of samples tested.

The fumes noted above were captured in the vapour space of an apparatus 300 illustrated in the photograph shown in FIG. 5, the apparatus 300 housing containing either the described 7% cutback composition of Product A mixed with class 180/200 penetration grade bitumen, or the mixture of 7% kerosene and class 180/200 penetration grade bitumen. The apparatus 300 shown in FIG. 5 and used in the trial followed Standard Test Method BS EN 15967:2011.

Figure 6:
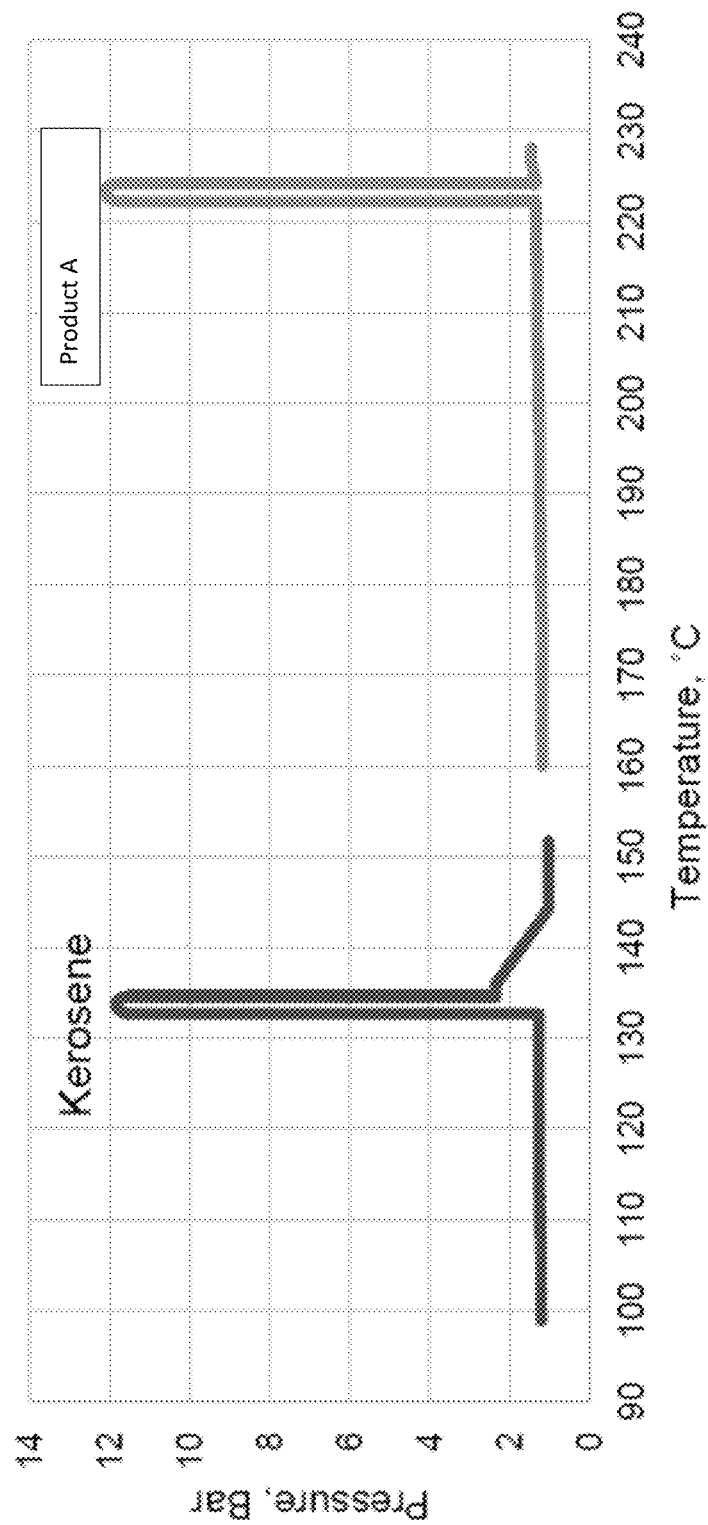
FIG. 6 is a graph showing the temperature at which a vapour explosion occurs and the maximum pressure generated by the explosion with spark ignition.

The graph of FIG. 6 shows the temperature at which a vapour explosion occurs and the maximum pressure generated by the explosion with spark ignition. The higher the temperature the safer the cutter.

As can be seen in FIG. 6, the maximum temperature reached prior to explosion for kerosene was approximately 132° C. By comparison, the cutback composition sample used marked Product A did not explode until approximately 222° C., a temperature markedly higher than kerosene.

This explosivity temperature is of key importance during application of bitumen. Depending on the grade of bitumen, the application (spraying) temperature varies from 140° C. to 180° C. for a cutback bitumen mixture comprising around 7% cutback composition. The harder the grade of the bitumen, the higher the spraying temperature hence, this spray temperature can increase beyond 180° C. As may be appreciated, an explosion temperature of the cutback bitumen well in excess of the application temperature will be of benefit for safety and handling.

Example 9

As noted in the above description, an advantage of the described cutback compositions is that the have a desirable dilution ratio compared to art cutback compositions such as kerosene. A superior dilution ration leads to a comparable reduction in bitumen viscosity for a given amount of cutback composition. Less use of cutback composition to achieve a desired viscosity leads to reduced material costs among other benefits.

Figure 7:
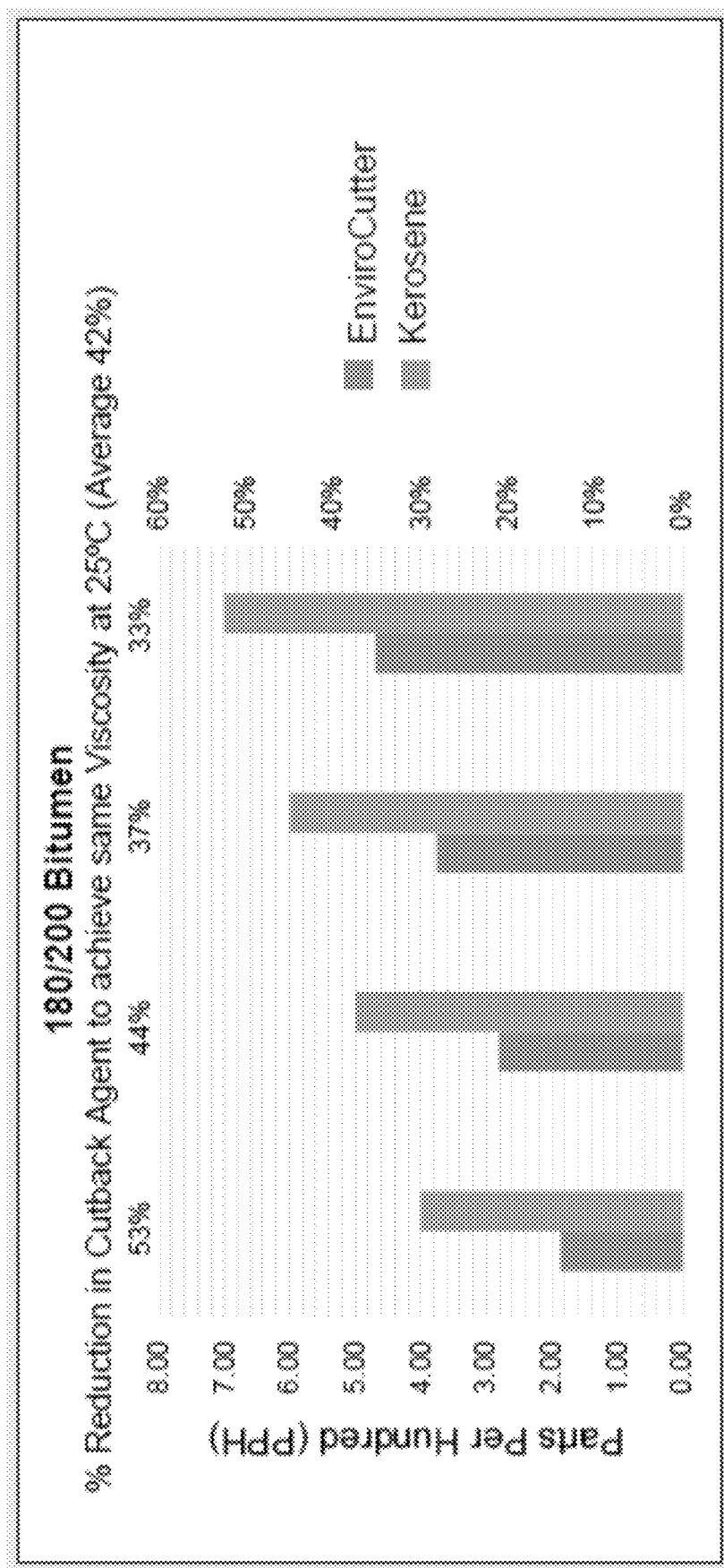
FIG. 7 is a graph illustrating a side by side comparison of the dilution ratio for the described cutback composition against that for kerosene in class 180/200 bitumen to achieve the same viscosity.
Figure 8:
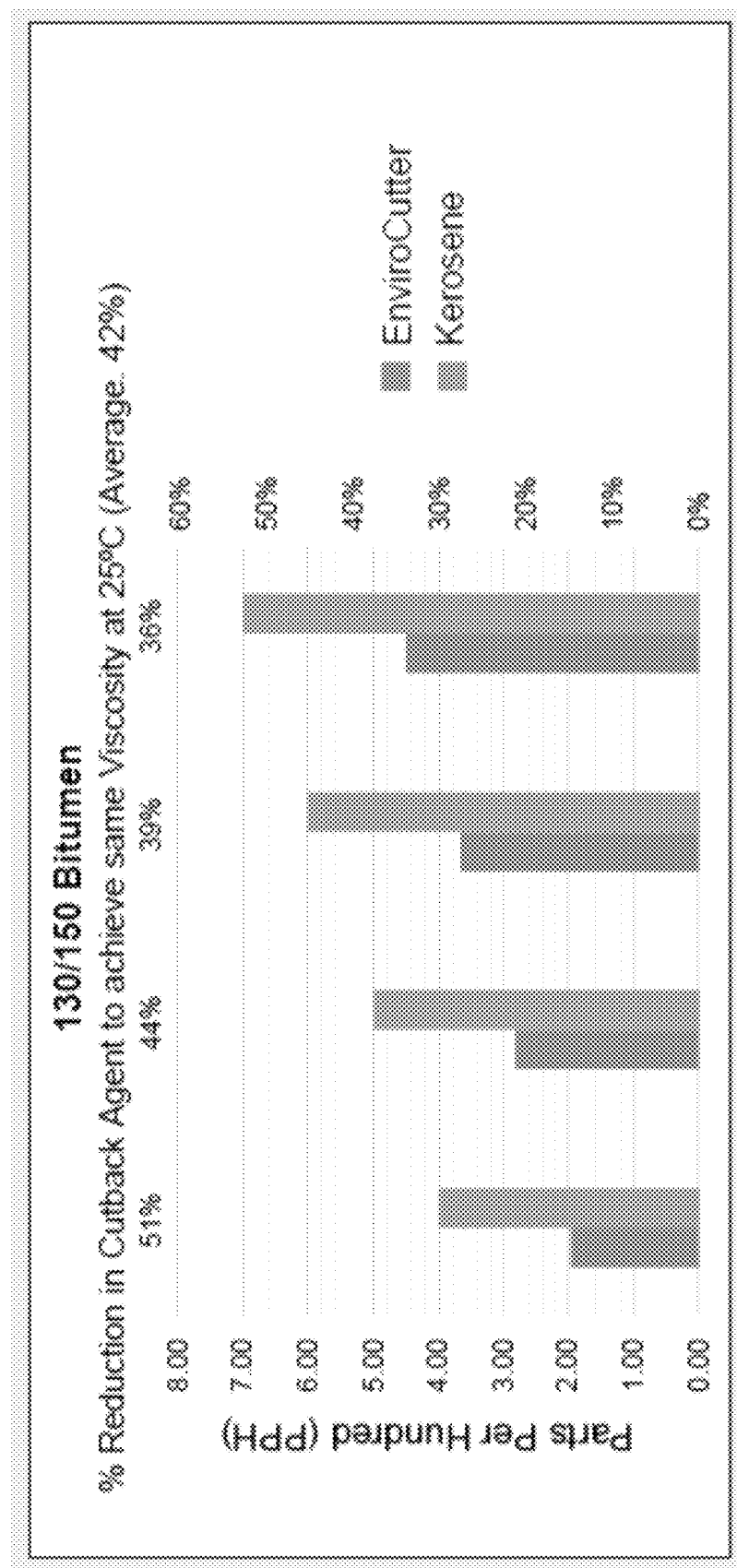
FIG. 8 is a graph illustrating a side by side comparison of the dilution ratio for the described cutback composition against that for kerosene in class 130/150 bitumen to achieve the same viscosity.
Figure 9:
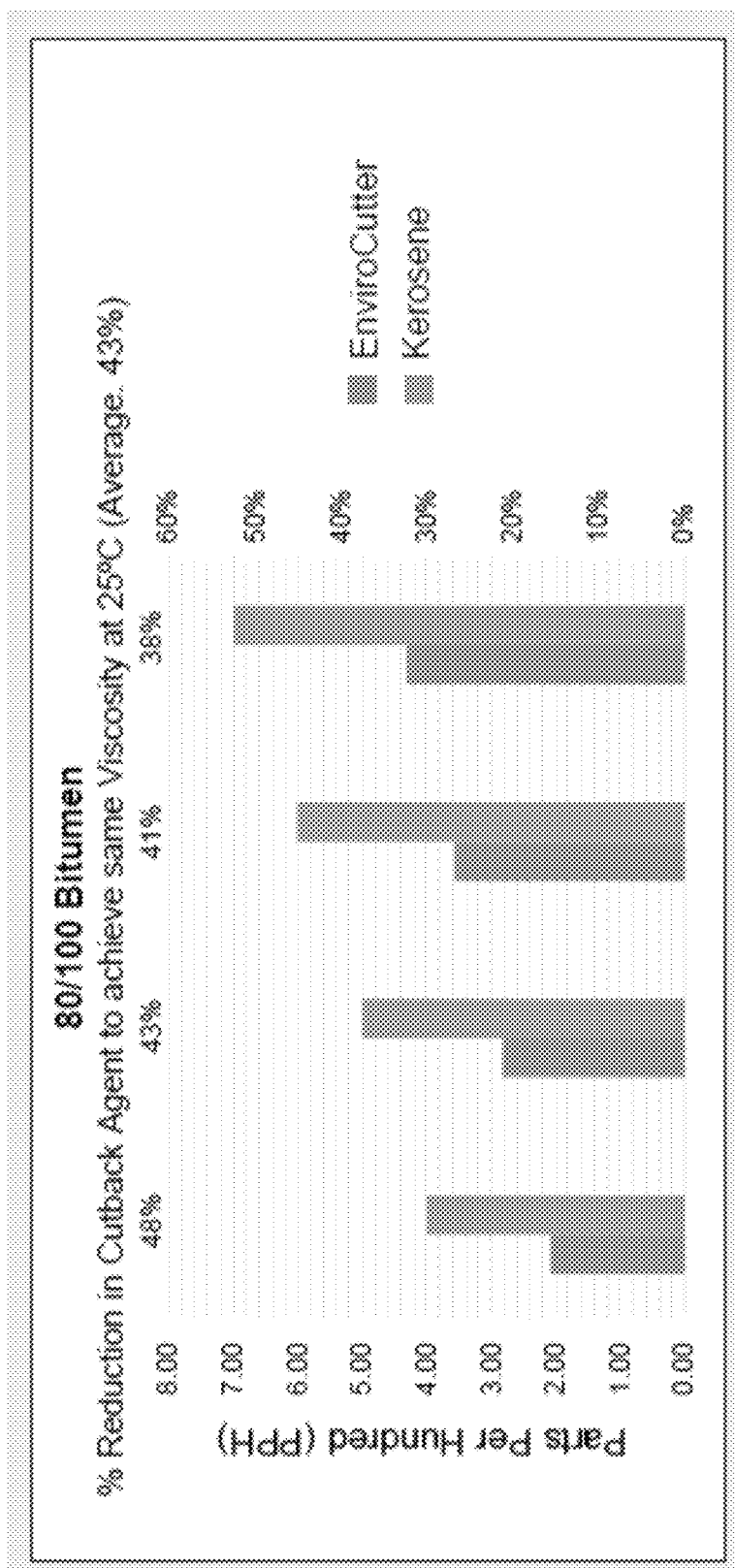
FIG. 9 is a graph illustrating a side by side comparison of the dilution ratio for the described cutback composition against that for kerosene in class 80/100 bitumen to achieve the same viscosity.

A series of experiments were completed by the inventors comparing the dilution ratios of various concentrations of cutback compositions using the Product A cutback composition mixed with bitumen and these findings compared to the same concentration of kerosene needed to achieve given viscosity. Several comparisons were made using varying classifications of bitumen from 180/200 class bitumen (results shown in FIG. 7); 130/150 class bitumen (results shown in FIG. 8) and 80/100 bitumen (results shown in FIG. 9). Note that the Product A composition results are shown in the darker column on the left of each combination and termed 'Envirocutter' in the legend in FIGS. 7 to 9. As shown in the Figures, consistent across all bitumen types tested and concentrations of cutback composition added was that the cutback composition of Product A was far superior to kerosene in all tests and achieving a desired reduction in viscosity of the given volume of cutback composition.

Example 10

In this trial a comparison was made between the cutback composition of Product A and kerosene as a cutback composition both in bitumen mixtures to determine the adhesion of each cutback bitumen mixture as measured by chip retention percentage. This was important to ensure that the alternative cutback composition described does not impact on chip adhesion.

The trial comprised mixing 180/200 grade bitumen with a polyamine adhesion agent (0.5% by weight for both samples) and then mixing 3% by weight of the cutback composition of Product A and in a separate mix, a combination of 3% kerosene and bitumen. Grade 3 greywacke aggregate was used as chip in the adhesion test.

Figure 10:
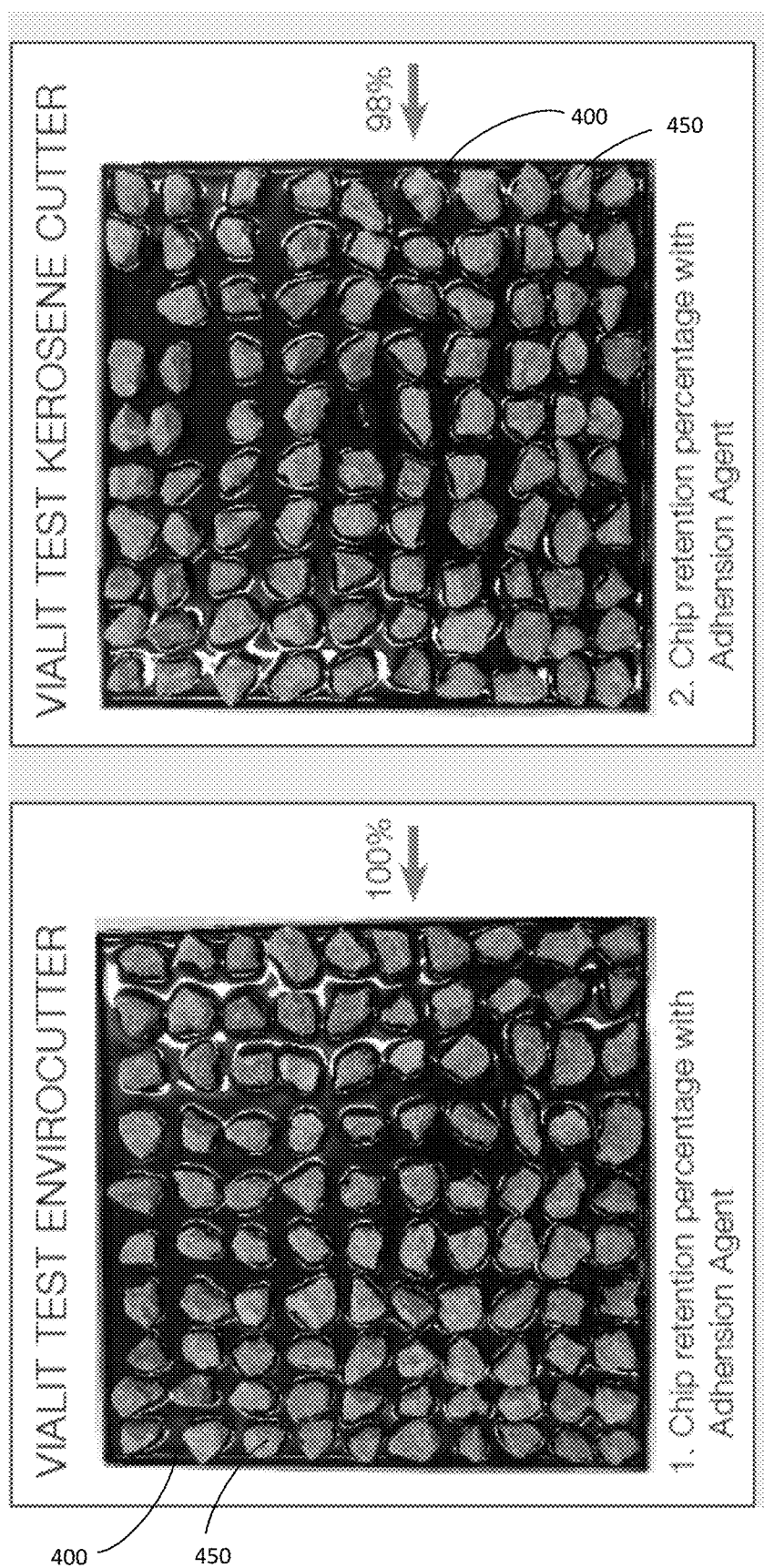
FIG. 10 shows photos of the adhesion observed for the cutback composition described herein on the left and the adhesion observed for a kerosene cutback composition on the right.

Each separate cutback bitumen mixture was sprayed to a surface and then the aggregate applied and the level of adhesion observed post application. As shown in FIG. 10, in the trial completed, the cutback composition 400 of Product A (labelled 'EnviroCutter' in FIG. 10) had 100% adhesion with all aggregate 450 applied adhering to the cutback bitumen mixture 400 in the pattern applied. For the kerosene cutback bitumen mixture, 98% adhesion was observed with a few stones of aggregate 450 not adhered in the pattern applied.

This trial shows consistent adhesion for the cutback compositions described herein at a level equal to or better than that for kerosene as a cutback agent.

Example 11

Experiments were completed by the inventors using a purpose built spray booth for the controlled testing of spray application of bitumen and bituminous products to a simulated road surface (a heavy grade of brown paper). The spraying system has a number of Process Logic Controller (PLC) independently controlled functions controlling the following bitumen spraying variabilities:
Spraying temperature
Spraying nozzle pressure
Variable nozzle height
Variable nozzle type
Spraying rate
Spray width
Aggregate size
Aggregate application rate
Different environment temperatures
Different cutback composition percentage
Varying rates of adhesion agents The three important parameters with respect to the spraying of bitumen on to road surfaces are:
The bitumen application rate,
The bitumen application temperature,
The type and percentage of cutter used.

Considerable concern exists over the potential for accidents to occur to people working with hot bitumen, typically 170° C. to 180° C. for kerosene cutback compositions. Bitumen burns are nasty as the bitumen adheres to the skin and burns into the human body. Mitigation in part revolves around wearing safety clothing at all times. There however, remains the possible exposure to bitumen burns as roading persons are exposed to high ambient temperatures plus the reflection of sunshine onto the body and consequently are reluctant to wear safety clothing under such circumstances. Similarly the risk is present in respect to hot bitumen spills, equipment faults etc.

The inventors conducted a series of experiments using the above described cutback composition as the cutter in a common grade or amount of bitumen, in each case reducing the spray temperature down in increments from 170° C. The inventors found that the spray temperature could be reduced from 170° C. to 150, or 140, or 130, or 120, or 110 or even as low as 90° C. yet still achieve the same quality measures as that observed using a kerosene cutback composition.

Aspects of the bitumen cutback compositions and methods of use thereof have been described by way of example only and it should be appreciated that modifications and additions may be made thereto without departing from the scope of the claims herein.

What is claimed is:

1. A bitumen cutback composition comprising Compound A with a formula:

R1—X—R2            [COMPOUND A]

where R1 is alkyl or phenyl hydrocarbon group;
X is an O—C=O group; and
R2 is a C1-C13 hydrocarbon chain branched or non-branched, with none, one, or more than one, oxygen interruption(s),
wherein the bitumen cutback composition comprises diethylene glycol monoethyl ether acetate, ethyl benzoate and 2,2,4-trimethyl-1,3-pentanediol monoisobutyrate.

2. The bitumen cutback composition as claimed in claim 1 wherein R1 is an alkyl group with less than or equal to 13 carbon atoms, the alkyl group being branched or straight.

3. The bitumen cutback composition as claimed in claim 1 wherein Compound A comprises a total of 6 to 13 carbon atoms.

4. The bitumen cutback composition as claimed in claim 1 wherein the bitumen cutback composition further comprises at least one of:
alkyl esters of fatty acids;
esters of trihydroxy alcohols;
mono ester, or di, or tri, hydroxy alcohols;
phenyl alkyl esters;
phenoxy alcohols and their esters;
ether alcohols and their esters; and
combinations thereof.

5. The bitumen cutback composition as claimed in claim 1 wherein the bitumen cutback composition is substantially miscible with bitumen at ambient temperature and pressure.

6. The bitumen cutback composition as claimed in claim 1 wherein the bitumen cutback composition has a flash point greater than 50° C. at ambient temperature and pressure.

7. The bitumen cutback composition as claimed in claim 1 wherein the bitumen cutback composition further comprises at least one solubility and/or stability enhancer compound selected from:
esters of carboxylic acids, esters of trihydroxy alcohols, biodiesel, mono ester of di or tri hydroxy alcohols, and combinations thereof.

8. The bitumen cutback composition as claimed in claim 7 wherein the bitumen cutback composition solubility and/ or stability enhancer compound comprises 20-30% by weight of the cutback bitumen composition.

9. The bitumen cutback composition as claimed in claim 1 wherein the bitumen cutback composition has a water content of less than 1000 mg/kg.

10. The bitumen cutback composition as claimed in claim 1 wherein the bitumen cutback composition is non-aqueous.

11. The bitumen cutback composition as claimed in claim 1 wherein a rate of transfer of the bitumen cutback composition from bitumen is substantially similar as that for a kerosene containing bitumen cutback composition.

12. The bitumen cutback composition as claimed in claim 1 wherein the bitumen cutback composition confers a storage stability on a cutback bitumen mixture comprising the bitumen cutback composition as measured in terms of viscosity and miscibility of at least 3 days without a substantial change from the viscosity and miscibility measured after initial formation of a cutback bitumen mixture.

13. The bitumen cutback composition as claimed in claim 1 wherein the bitumen cutback composition has a density of 900-1100 kg/m$^3$.

14. A method of temporarily reducing a viscosity of bitumen comprising:
   selecting bitumen to be treated; and
   mixing the selected bitumen with a bitumen cutback composition as claimed in claim 1.

15. A method of applying bitumen to a substrate by:
   mixing bitumen with a bitumen cutback composition as claimed in claim 1 to form a cutback bitumen mixture; and
   spraying the cutback bitumen mixture to a substrate, the cutback bitumen mixture during spraying being at a temperature of less than 150° C.;
   wherein aggregate is then applied to the cutback bitumen mixture on the substrate.

* * * * *